United States Patent [19]

Hassler

[11] Patent Number: 5,081,994
[45] Date of Patent: Jan. 21, 1992

[54] METHOD AND APPARATUS FOR AVOIDING AMBIGUITIES IN A PULSE DOPPLER APPARATUS

[75] Inventor: Dietrich Hassler, Uttenreuth, Fed. Rep. of Germany

[73] Assignee: Siemens Aktiengesellschaft, Munich, Fed. Rep. of Germany

[21] Appl. No.: 673,029

[22] Filed: Mar. 21, 1991

[30] Foreign Application Priority Data

Mar. 23, 1990 [EP] European Pat. Off. ............ 90105583

[51] Int. Cl.$^5$ .............................................. A61B 8/02
[52] U.S. Cl. .............................. 128/661.09; 73/861.25
[58] Field of Search ...................... 128/660.05, 661.07, 128/661.08, 661.09, 661.10; 73/861.25

[56] References Cited

U.S. PATENT DOCUMENTS

| | | | |
|---|---|---|---|
| 4,680,739 | 7/1987 | Lannuzel | 367/90 |
| 4,800,891 | 1/1989 | Kim | 128/661.09 |
| 4,928,698 | 5/1990 | Bonnefous | 128/661.09 |
| 4,979,513 | 12/1990 | Sakai et al. | 128/661.09 |
| 4,993,417 | 2/1991 | Seo | 128/661.09 |
| 4,995,397 | 2/1991 | Nishiyama et al. | 128/661.09 |

FOREIGN PATENT DOCUMENTS 0161956 11/1985 European Pat. Off. .
0212527 4/1987 European Pat. Off. .
0338592 10/1989 European Pat. Off. .

OTHER PUBLICATIONS

Ultrasonic Imaging 8, 73-85 (1986), "Time Domain Formulation of Pulse-Doppler Ultrasound and Blood Velocity Estimation by Cross Correlation", by O. Bonnefous et al., pp. 73-85.

*Primary Examiner*—Francis Jaworski
*Assistant Examiner*—George Manuel
*Attorney, Agent, or Firm*—Hill, Van Santen, Steadman & Simpson

[57] ABSTRACT

In a method for calculating the flow velocity of, for example a blood stream, ultrasound pulses are repeatedly transmitted into an examination region with a spacing of a pulse repetition time (Tr). An autocorrelation function (Kii) and a cross correlation function (Kiq) in an environment (Tr±1.5 T) around the pulse repetition time (Tr) are formed from the quadrature components (i, q) of echo signals of respectively successive transmission pulses. The shift of the maximum (Δt) of the correlation functions (Kii, Iiq) relative to the pulse repetition time (Tr) as a result of the velocity of the flow is fixed in a region (Bn) wherein the ambiguous, mean Doppler frequency (ω) identified in a traditional way lies. The apparatus for the implementation of this method comprises a shift identification circuit for this purpose. This shift identification circuit calculates the shift of the maximum (Δt) of one or both correlation functions (Kii, Kiq) relative to the pulse repetition time (Tr).

16 Claims, 5 Drawing Sheets

METHOD AND APPARATUS FOR AVOIDING AMBIGUITIES IN A PULSE DOPPLER APPARATUS

BACKGROUND OF THE INVENTION

The invention is directed to a method for avoiding ambiguities in a pulse Doppler apparatus, wherein:
- transmission pulses are periodically transmitted with a pulse repetition time into a region having moving particles,
- the received echo signals from this region are resolved into their quadrature components,
- the autocorrelation function of one quadrature component or the echo signals and the cross-correlation function of both quadrature components are formed at the location of the shift by the pulse repetition time, and
- the ambiguous mean Doppler radian frequency is identified from the correlation function values at the location of the shift by the pulse repetition time.

The invention is likewise directed to an apparatus wherein:
- a transmitter periodically transmits transmission pulses with a pulse repetition time into a region having moving particles,
- a receiver with a demodulator resolves the received echo signals from this region into their quadrature components,
- two low-pass filters are connected to the demodulator and filter the quadrature components such that they contain only the spectrum of the pulse envelopes, so that the transmission frequency and high harmonics thereof are suppressed,
- two analog-to-digital converters are connected to the low-pass filters that digitize the low-pass-filtered quadrature components,
- two filters are connected to the analog-to-digital converters and free the digitized quadrature signals of permanent echoes, and
- two region or domain gates distribute signal portions of the output signals of the filters onto parallel processing channels, whereby the signal portions correspond to signal-collecting regions in the region or domain having moving particles.

In the pulse Doppler apparatus, the Doppler frequency shift must not be greate than half the pulse repetition frequency if ambiguities are to be avoided in the measurement of center frequency or velocity. In view of the ranges of measurement practically required, this represents a problem area of the pulse Doppler technique which is to be taken seriously, particularly in cardiology. High flow rates that physiologically occur in the heart cannot be ditinguished from lower flow rates. This is all the truer the more deeply the flow lies in the body.

Given narrow Doppler spectra and only one flow direction present at one time, the range can be expanded over and above this according to U.S. Pat. No. 4,680,739, incorporated by reference herein, since the conditions for a steady course of the center frequency with time are exploited. This, however, assumes that an initial value is known.

A method of the type initially cited wherein the mean Doppler frequency and the band width are defined from the correlation functions of successive echoes is disclosed by U.S. Pat. No. 4,800,891, incorporated herein by reference. In the arc-tangent function employed therein, one quarter of the pulse repetition time is already correspondingly ambiguous beginning with ±90°. When the information that lies in the creation of the operational sign of the quotient of numerator and denominator operational signal is utilized, then the unambiguity can be expanded up to ±180°.

Another method for identifying the mean flow rate is presented in the article by O. Bonnefous and P. Pesque bearing the title, "Time Domain Formulation of Pulse-Doppler Ultrasound and Blood Velocity Estimation by Cross Correlation" that appeared in Ultrasonic Imaging 8, pages 73 through 85 (1986). The time shift of undemodulated echo signals of successively following transmission pulses is identified therein by evaluating the correlation function, and direct conclusions about the flow rate are drawn therefrom. A Doppler spectrum, however, is not acquired. Assuming a narrow Doppler spectrum, the mean velocity component in the sound direction, and thus the center frequency of the spectrum, can in fact be identified with low precision but without a domain restriction, i.e. unambiguously. When, however, the band width of the spectrum or farther-reaching properties of the flow are to be identified, then this assumes a high precision of the time measurement and long measuring times. An analysis of the flow given realizable transmission pulse lengths and running time measurements thus encounters practical difficulties. Moreover, the formation of the correlation function requires a digitization of the undemodulated, high-frequency echo signals which, due to the high dynamic demand as a result of the simultaneously occurring permanent echoes, is difficult to realize.

SUMMARY OF THE INVENTION

It is therefore an object of the invention to specify a method and an apparatus with which the Doppler frequency shift moving particles can be simply and exactly calculated.

According to the method of the invention, the correlation function is additionally formed in an environment of the pulse repetition time, whereby the environment is limited by at least double the pulse running time that a pulse requires in order to cover the distance that is traversed by a particle having the maximum velocity to be measured. The shift of the maximum of one or both correlation functions is calculated with reference to the pulse repetition time. A frequency range is defined from the shift of the maximum. The value that lies in the frequency range that is prescribed by the shift of the maximum is selected from the ambiguous, mean Doppler frequency and is supplied for further signal processing.

In the apparatus of the invention:
- every processing channel comprises two correlators that calculate the autocorrelation function and the cross correlation function in an environment of the shift around the pulse repetition time, whereby the environment is limited by at least twice the pulse running time that a pulse requires in order to cover the distance that is traversed by a particle having the maximum velocity to be measured;
- the correlators are each respectively connected to a unit for forming the mean value that averages the correlation function of a plurality of transmission pulses;
- the units for forming the mean values are each respectively connected to a selection circuit, these selection circuits selecting the value at the location of the shift around the pulse repetition time from the averaged correlation functions;

a shift identification circuit is connected to the units for forming the mean value, this shift identification circuit identifying the shift of the maximum of one or both correlation functions vis-a-vis the pulse repetition time; and a region-identifying circuit is connected to the shift identification circuit, this regionidentifying circuit defining a region from the shift of the maximum within which one value of the plurality of possible values of the mean Doppler radian frequency identified from the signals of the selection circuit lies, whereby the value identified in such fashion is supplied for further signal processing.

The measurement of the time shift of the maximum of the correlation function is employed with what is a reduced precision demand made of the time acquisition in comparison to the prior art in order to eliminate ambiguities of the pulse Doppler technique. At the same time, an evaluation of the spectrum remains possible so that no information need be foregone as in the direct calculation of the center frequency from the time shift measurement according to O1 Bonnefous and P. Pesque. The precision remains at the previous level. The precision demand made of the additional calculation of the shift of the maximum of the correlation function is reduced to a realizable degree on the basis of the combination with the known technique.

In an advantageous development of the invention, the shift of the maximum of that correlation function whose function value is greatest at the location of the shift around the pulse repetition time is identified. It is thus assured that an adequately high signal level can always be processed. The precision in the identification of the time shift is enhanced since the amplitudes of the correlation function fluctuate in dependence upon the velocity of the medium to be measured.

In another advantageous development of the invention, the shift of the maximum is calculated from the sum of the absolute values of the two correlation functions. As a result of this technique, the precision can be selected in the calculation of the time shift without the correlation function which is greatest in terms of amplitude.

An especially advantageous development of the invention is that the echo signals are resolved into their quadrature components in such a broad-banded fashion that the spectrum of the echo signals of the individual transmission pulses is essentially preserved. It thereby becomes possible to digitize the demodulated signal with adequate precision using relatively slow analog-to-digital converters having high dynamics (bit depth).

In another development of the invention, the digitized quadrature signals are freed of the permanent echoes. The suppression of permanent echoes can be digitally realized quite well. After the elimination of the permanent echoes, lower demands are made of the dynamics of the following signal processing circuit.

In a further development of the invention, the quadrature signals freed of the permanent echoes are divided into a plurality of successive time domains which correspond to a plurality of signal collecting areas, whereby the individual signal portions are further-processed in parallel channels. It thus becomes possible to identify the velocity distribution along the scan direction. The velocity distribution along a scan direction is the basis for presenting the flow distribution in a section plane (flow imaging).

Two exemplary embodiments of the invention shall now be described.

DESCRIPTION OF THE PREFERRED EMBODIMENTS

Figure 1:
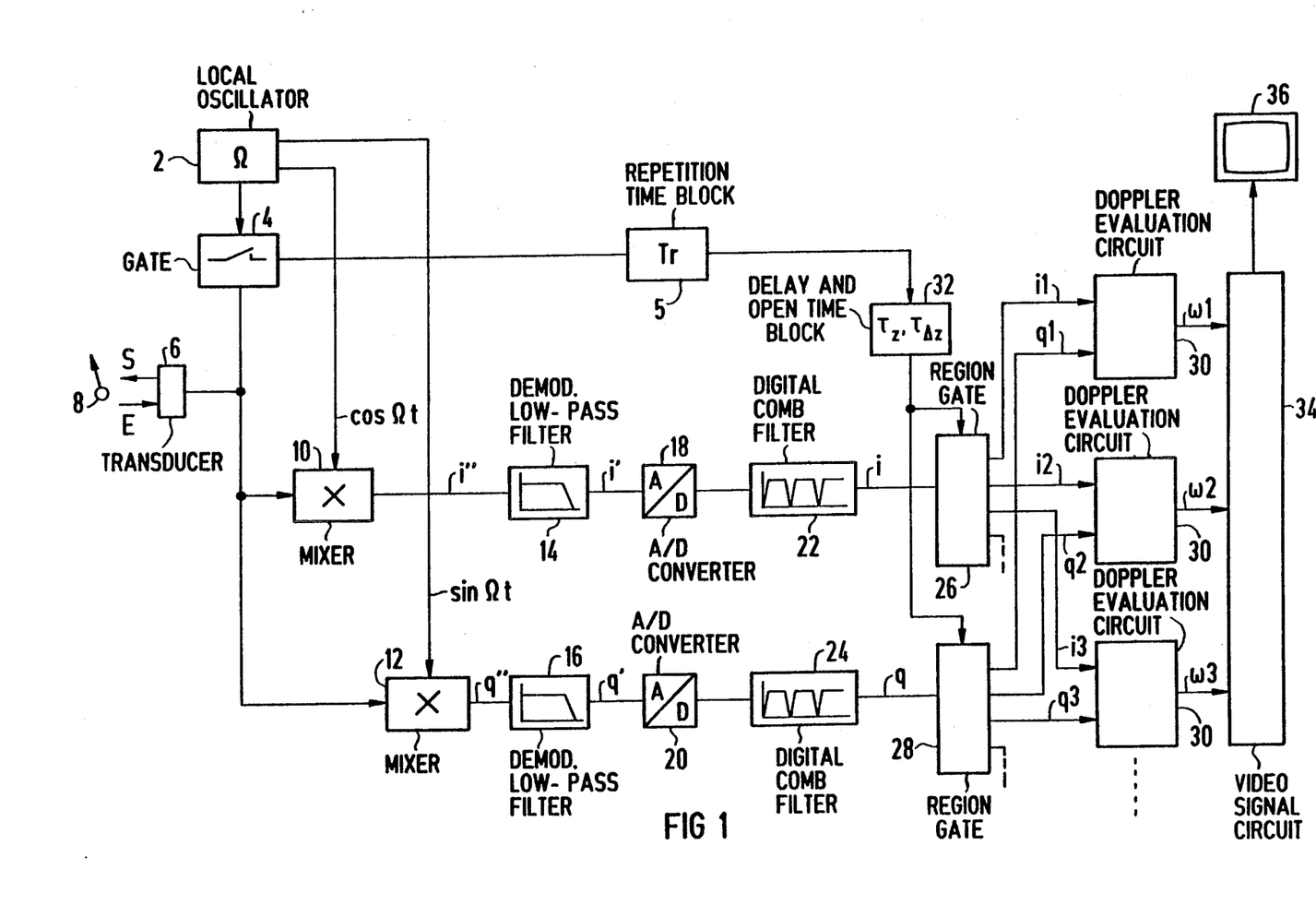
FIG. 1 is a block circuit diagram of a medical pulse Doppler imaging apparatus.

FIG. 1 shows a block circuit diagram of a medical pulse Doppler imaging apparatus with which the velocity distribution in a section plane of an xamination subject can be presented (flow imaging). A local oscillator 2 supplies a cosine signal with a radian frequency $\omega$ from which a gate 4 having a repetition time Tr of, for example, 200 ms, periodically gates out brief transmission pulses having a few oscillation periods. The repetition time Tr is illustrated by the repetition time block 5 in FIG. 1. A transducer 6 converts the electrical transmission pulses into ultrasound pulses which are beamed out in prescribable directions. The transducer 6 can be both an individual ultrasound transducer as well as an ultrasound transducer arrya having elementary transducers arranged in a row.

After every transmission, the transducer 6 receives the ultrasound signals reflected from boundary surfaces and moving particles 8 in, for example, a blood flow, and converts them into electrical signals. Tehse echo signals are respectively supplied to two mixers 10 and 12. In the mixer 10, the echo signals are multiplied in broad-band fashion by the cosine signal of the local oscillator 2. In the mixer 12 they are multiplied in broad-band fas ion with the sine signal of the local oscillator 2. The outputs of the mixers 10 and 12 are connected to two demodulation low-pass filters 14 and 16. The in-phase component i' is available at the output of the demodulation low-pass filter I4, and the quadrature component q' of the complex envelope of the echo signal is available at the output of the demodulation low-pass filter 16. The demodulation low-pass filters allow the spectrum of the pulse envelope to pass, but suppress the transmission frequency and higher harmonics thereof. They simultaneously represent the antialiasing filters for the following analog-todigital conversion. The two quadrature components i' and q' are digitally further processed from here on. For this purpose, they are respectively supplied to an analog-to-digital converter 18 or 20. The quadrature components i' and q' are digitized here with 6 MHz, given an output signal having 12 bit values. The digital outputs of the analog-to-digital converters 18 and 20 are each respectively connected to an input of a digital comb filter 22 or 24. The comb filters 22 and 24 contain stop locations at the spacing of the pulse repetition frequency $1/Tr$. Such filters can be relatively elegantly realized in digital fashion (stationary canceller) since, in the simplest case, the echo signals of two successive transmission pulses are subtracted from one another. Only the variation signals remain. Experience has shown, however, that filters of a higher order are required so that echo signals of a slowly moving boundary surface, for example of a blood vessel wall, can be more strictly distinguished from the signals of the blood flow. In other words, the digitized quadrature components i' and q' are freed of the signals of the stationary permanent echoes by the comb filters 22 and 24, so that only the pulsed quadrature Doppler signals i and q of the moving targets are present following the comb filters 22 and 24.

Since the pulsed Doppler signal is present in a low-frequency state without information losses, both the in-phase component i as well as the quadrature component q are now each respectively supplied to a region or domain gate 26 or 28. The region gates 26 and 28 distribute the signal portions corresponding to a defined depth position or region to a respective one Doppler evaluation circuit 30. The number of Doppler evaluation circuits 30 arranged in parallel thus oorresponds to the number of depth regions or domains. The Doppler evaluation circuits 30 calculate the mean Doppler radian frequency of the moving particles in a depth region $\Delta z$ from the quadrature components from this depth region $\Delta z$, for example the mean Doppler radian frequency $\omega 1$ in il and q1. In FIG. 1, the signal portions are referenced i1 and q1 for the first depth position or region, are referenced i2 and q2 for the second depth position or region, and are referenced i3 and q3 for the third depth position or region. These can be followed by further depth regions; only three Doppler evaluation circuits 30 however, are shown here for reasons of clarity. The depth positions or regions of the signal collecting regions are defined, based on a known velocity of sound according to the delay time and the open time $\tau_{\Delta z}$ of the gates 26 and 28, this being illustrated by the block 32. The values for the mean Doppler radian frequency $\omega 1$, $\omega 2$ . . . at the outputs of the Doppler evaluation circuits 30 are now processed according to the depth position in a video signal circuit 34 such that they can be portrayed on a picture screen 36 as a flow image in a section plane.

Figure 2:
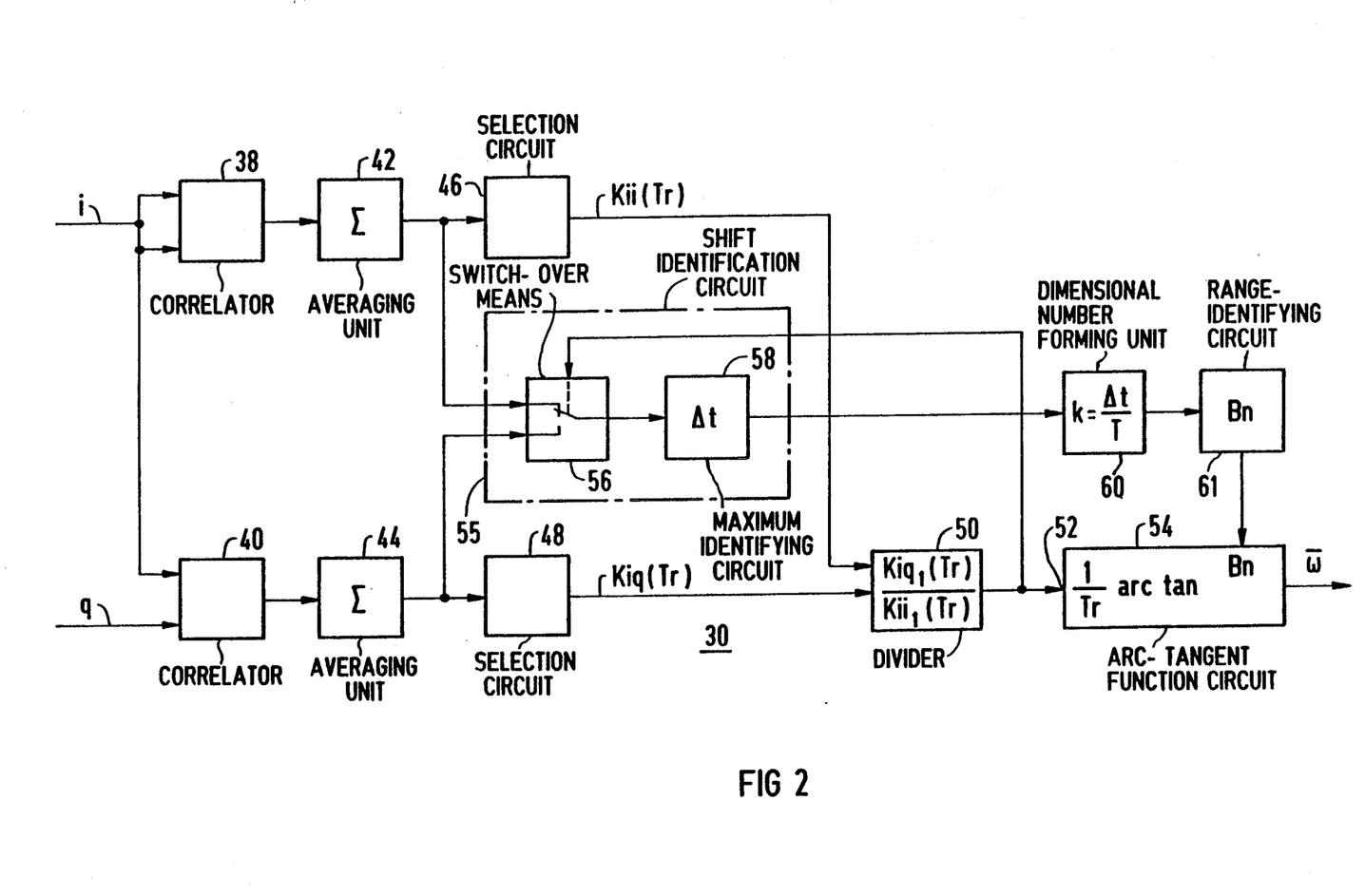
FIG. 2 is a block circuit diagram of a first Doppler evaluation circuit having a switch-over means for selecting the correlation function provided for evaluation.

FIG. 2 shows a first Doppler evaluation circuit in detail. Identifying the allocation of the depth region has not been discussed in detail here because the signal processing is identical for all depth regions. The in-phase component i corresponding to a depth region is supplied to a correlator 38. The correlator 38 forms the autocorelation function Iii $(Tr+t)$ of the in-phase component i of the echo signals of two successively following transmission pulses in an environment of the pulse repetition time Tr, for example one and one-half times the period duration T of the transmission frequency, i.e. $Tr \pm 1.5$ T. The environment for forming the correlation function is limited by at least twice the pulse running time which a pulse requires in order to cover the distance that is traversed by a particle whose velocity corresponds to the maximum velocity to be measured.

Moreover, the in-phase component i and the quadrature component q of a signal collecting region are supplied to a further correlator 40. The correlator 40 forms the cross correlation function Kiq $(Tr+t)$ of the in-phase component ia nd of the quadrature component q of the echo signals of two successive transmission pulses in an environment of the pulse repetition time. The environment is defined here in exactly the same way as the environment of the autocorrelation function.

The outputs of the correlators 38 and 40 are each respectively connected to an averaging unit 42 or 44. The averaging units 42 and 44 average the correlation functions of 5 to 10 successive transmission bursts.

The averaging units 42 and 44 are designed as adders. Here, however, the sum is not divided by the plurality of values utilized for averaging. Their outputs are each respectively connected to a selection circuit 46 or 48. The selection circuits 46 and 48 respectively select the value at the location of the pulse repetition time Tr from the correlation functions Kii or Kiq of the surrounding region. Both selected values are supplied to a divider 50. The divider 50 forms the quotient of cross correlation function Kiq (Tr) and autocorrelation function Kii (Tr). The output of the divider 50 is connected to an input 52 of an arc-tangent function circuit 54. All possible values of the mean Doppler radian frequency $\omega$ multiplied by the pulse repetition time Tr are thus determined by the arc-tangent function circuit 54.

The selection of the value of the Doppler frequency shift in fact valid for the measurement location occurs in the sub-circuit to be set forth below.

The averaged correlation function values Kii and Kiq of the averagig units 42 and 44 are supplied to a shift identification circuit that comprises a change-over means 56. The change-over means 56 is controlled dependent on the quotient from the divider 50 such that the shift of the maximum of the correlation function having the greatest values is respectively calculated. When the quotient is greater than one, i.e. when the cross correlation function Kiq is greater than the autocorrelation function Kii, then the cross correlation function Kiq is investigated for the position of its maximum. Otherwise, when the quotient is smaller than one, the autocorrelation function Kii is investigated for the position of its maximum. The change-over means 56 forwards the correspondingly selected value to a mximum-identifying circuit 58. The shift of the maximum can be found in that the maximum of the function is sought by comparing all samples of the selected correlation function Kii or Kiq with digital computers, and the time shift corresponding thereto with respect to the pulse repetition time Tr is identified. Instead of systematically searching for the maximum among all samples, the zero location of the derivation of the function an also be sought, whereby minimums are to be excluded. A further possibility that can compensate measurement errors as an integral method is known as "center of gravotu fpr,i;s/" In accordance therewith, the time shift $\Delta t$ of the maximum results from $$t = \frac{\int_{-TB}^{TB} t \, Kii \, (Tr + t) \, dt}{\int_{-TB}^{TB} Kii \, (Tr + t) \, dt}.$$

It takes the entire pathe of the curve into consideration. The region TB wherein the correlation function is found, however, must be selected larger than the center of gravity formula is applied, than in the case of the above other methods.

The relative shift with reference to the period duration of the transmission frequency T is formed in a divider 60 from the shift $\Delta t$ of the maximum of the correlation function Kii or Kiq. According to the following table, this index or dimensional number k formed in the divider 60 specifies the ranges Bn for the hitherto ambiguously defined Doppler radian frequency $\omega$.

| Range of the Dimensional Index Number k | Range of the Arc Tangent (range of the Doppler Frequency) |
|---|---|
| $-\frac{1}{4} < k < \frac{1}{4}$ | $-90° < \omega Tr < 90°$ |
| $\frac{1}{4} < k < \frac{3}{4}$ | $90° < \omega Tr < 270°$ |
| $\frac{3}{4} < k < 5/4$ | $270° < \omega Tr < -90°$ |
| $-\frac{3}{4} < k < -\frac{1}{4}$ | $-270° < \omega Tr < -90°$ |
| $-5/4 < k < -\frac{3}{4}$ | $-450° < \omega Tr < -270°$ |

The Doppler radian frequency $\omega$ results from the division of the arc-tangent value by the pulse repetition time Tr.

Figure 3:
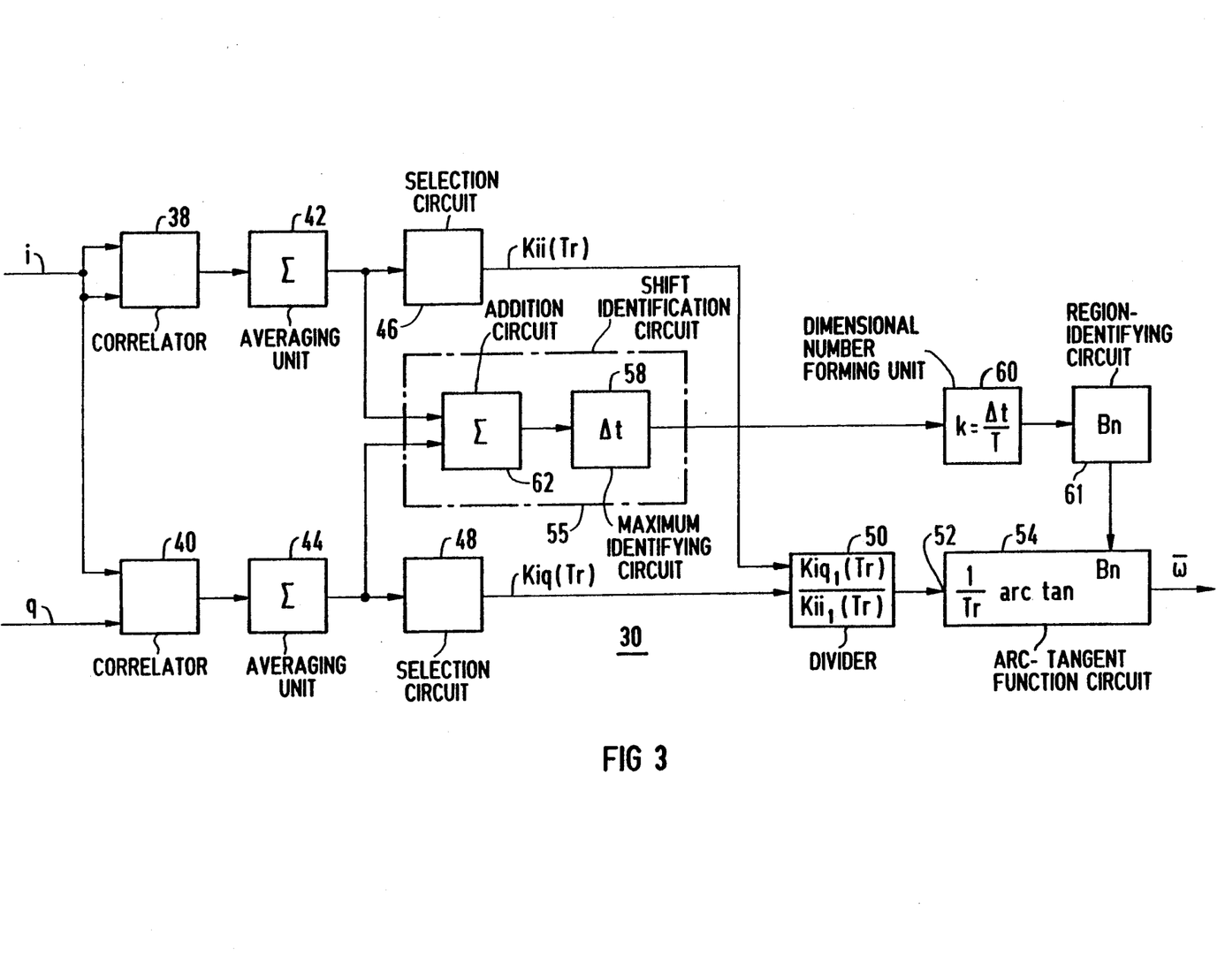
FIG. 3 is a block circuit diagram of a second Doppler evaluation circuit having an addition circuit which delivers the sum of the autocorrelation function and the cross correlation function for evaluation.

The Doppler evaluation circuit 30 shown in FIG. 3 differs from the Doppler evaluation circuit shown in FIG. 2 since the switch-over means in FIG. 2 is replaced by an addition circuit 62. The addition circuit 62 is supplied both with the autocorrelation function Kii (Tr+t) from the averaging unit 42 as well as with the cross correlation function Kiq (Tr+t) from the averaging unit 44. The sum of both correlation functions Kii (Tr+t) and Kiq (Tr+t) is now supplied to the maximum-identifying circuit 58 for the calculation of the time shift $\Delta t$. The employment of the addition circuit avoids the interrogation to see which value of the correlation function Kii (Tr) or Kiq (Tr) is greatest at the location of the shift around the pulse repetition time Tr. The connection from the output of the divider 50 to the control input of the switch-over means 56 needed in the Doppler evaluation circuit 30 of FIG. 2 is thus eliminated in the Doppler evaluation circuit 30 of FIG. 3.

As a consequence of the errors conditioned by measuring time, this technique can be applied for fast Doppler imaging methods only for a minimum of sixteen resolution cells in common. An unambiguous statement for the average is thus only obtained in an image field of approximately 1cm$^2$. Given the assumption that the differences in measured values are not greater than the ambiguity range, the mean value can be formed in this from the conventionally acquired values for all ambiguity ranges, and the mean values can be handled as set forth up to now, namely the smallest difference of the argument from the index k.

Figures 4, 5, 6:
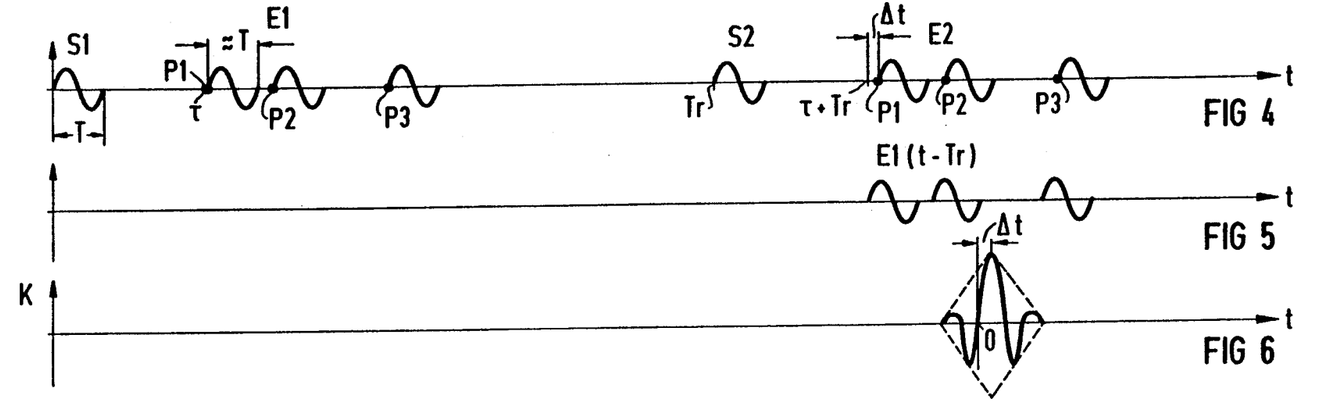
FIG. 4 is a time diagram of two successive, idealized echo signals.
FIG. 5 is a time diagram of an echo signal shifted by the pulse repetition time.
FIG. 6 is a correlation function of the echo signals of two successive transmission pulses.

The function of the circuit according to FIGS. 1 through 3 shall be set forth below with reference to signal curves. FIG. 4 illustrates the echo signals E1 and E2 as a reaction to two successive transmission bursts S1 and S2 of three point reflectors P1, P2, and P3 in the time domain. A transmission signal is composed of a period T of a sinusoidal oscillation in the spacing of the pulse repetition time Tr.

The three reflectors P1, P2, and P3 in FIG. 4 are representative of a great number of blood partioles of a flow path that have a velocity component in the sound direction. In reality, the echo signals superimpose mutually and this superimposition changes with time because particles continuously leave the signal collecting region and others enter into a new position relative to one another. For didactic reasons, the three signals shown here remain separately visible. They do not change their allocation relative to one another like the overwhelming majority of acquired particles at the physiologically occurring velocities and the pulse repetition times Tr that are employed in practice. The spacings of the particles P1, P2, and P3 are selected such that different phase relations relative to the transmission frequency occur. A change of particles with time is not shown.

When the echo E1 of the particle P1 closest to the transducer to the first transmission pulse S1 begins after the time $\tau$ following the first transmission pulse Sl, then, due to the motion in the sound direction, the second echo E2 of the same particle Pl as a reaction to the second transmission pulse S2 reaches the transducer after the time $\tau + \Delta t$ following the second transmission pulse S2. after the The same shift is valid for the signals of the other point reflectors P2 and P3. The first echo signal E1 around the pulse repetition time Tr shifted under the second echo signal E2 in FIG. 4 is shown in FIG. 5. When the correlation of the second echo signal E2 with the first echo signal E1 shifted in this way is formed, and when only power components of signals that derive from the same particle are considered in the formation of the correlation—i.e. no transverse power—then the correlation function of FIG. 6 is obtained. With respect to form, it represents the autocorrelation of the transmission signal S1 or S2; however, it is time-shifted by $\Delta t$.

Figure 7:
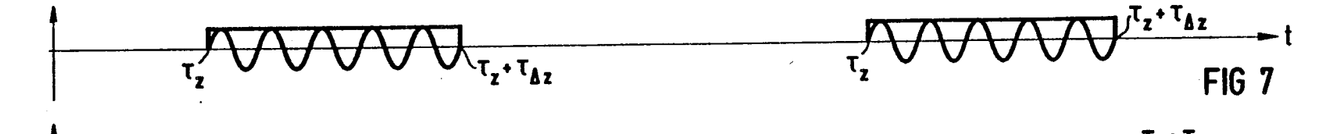
FIG. 7 is a time diagram of a sinusoidal oscillator signal for demodulating the echo signals.
Figure 8:
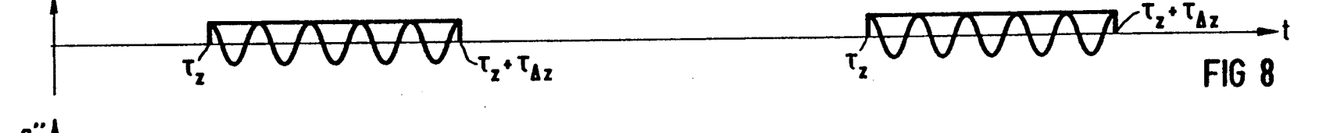
FIG. 8 is a time diagram of a cosine-shaped oscillator signal for demodulating the echo signals.

The power components in the correlation that arises between signals of different particles (i.e., the transverse power) out of consideration, are left out for the following reasons. When this type of correlation is considered over a longer time—theoretically infinitely long—then the power components taken into consideration up to now will always lead to identical correlation functions and add up. The transverse powers, however, lead to correlation components that occur in a statistically fluctuating shift because the spatial allocation of the particles is variable over the long term. Positive parts of the function are in turn cancelled by the negative parts. When, instead of waiting for two echo signals, one waits for many and a correlation is carried out in the region of the time shift Tr, then the curve shown in FIG. 6 is obtained. Due to the mutual compensation of the transverse power components, the same result that was formed from only two signals is obtained when averaging many correlation functions. This is immediately obvious since the correlation involves a matter of an integration wherein the product of the sum is equal to the sum of the products in the integrand. The curves of FIG. 6 are thus not strictly valid for the illustrated individual case, but only for the limit value of the correlation of many echo sequences. For reasons of simplification, the function of the low-pass filters 14 and 16 of the comb filters 22 and 24 in FIG. 1 is not taken into consideration in the signals shown in the following FIGS. 7 through 16. The function of the reception gates 26 and 28 in FIG. 1 is connected to the oscillator signals since pulsed oscillator signals are shown in FIGS. 7 and 8. The pulse length of the oscillator signals extends from $\tau_z$ through $\tau_2 + \tau\Delta_z$. FIG. 7 shows the sinusoidal oscillator signal and FIG. 8 shows the cosine-shaped oscillator signal of the oscillator 2 shown in FIG. 1.

Figure 9:
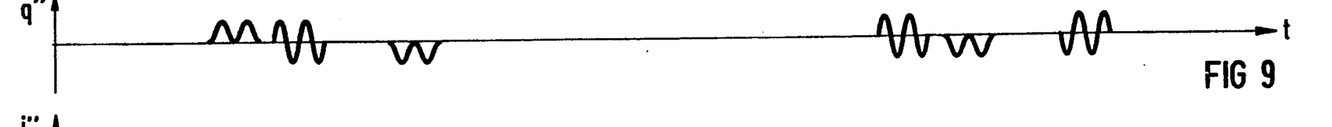
FIG. 9 is a time diagram of an echo signal mixed with the sinusoidal oscillator signal (quadrature component of the echo signal)

The unfiltered mixed product of the echo signals E1 and E2 with the sinusoidal oscillator signal of FIG. 7 is shown in FIG. 9. It is referenced q' and is the output signal of the mixer 12 shown in FIG. 1.

Figure 10:
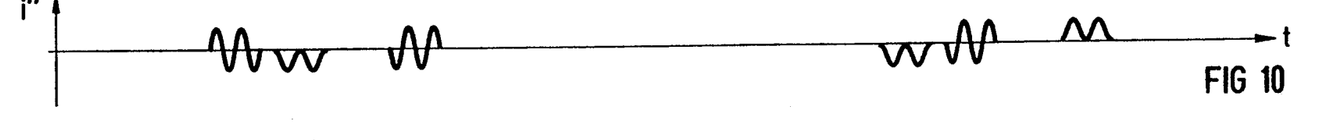
FIG. 10 is a time diagram of an echo signal mixed with the cosine-shaped oscillator signal (in-phase component of the echo signal)

The unfiltered mixed product of the echo signals E1 and E2 with the cosine-shaped oscillator signal is shown in FIG. 10. It is referenced i'' and appears at the output of the mixer 10 shown in FIG. 1.

Figure 11:
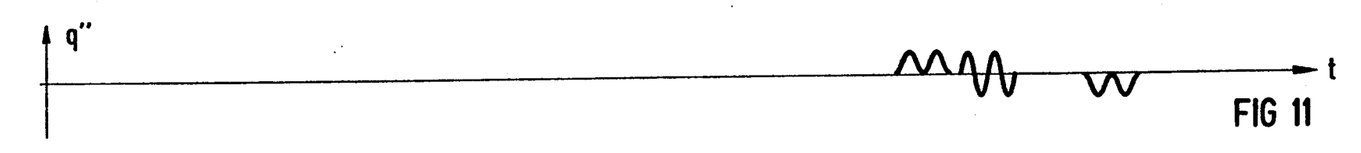
FIG. 11 is a time diagram of the quadrature component of the echo signal of the first transmission pulse shifted by the pulse repetition time.
Figure 12:
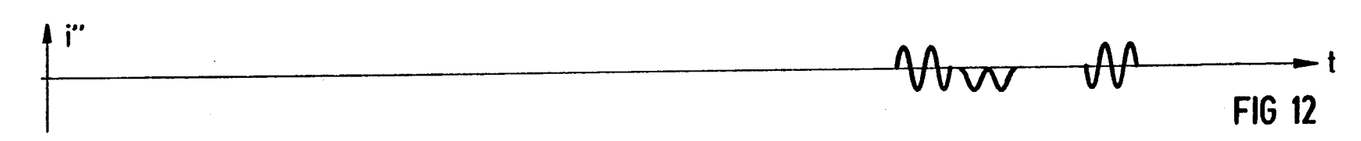
FIG. 12 is a time diagram of the in-phase component of the echo signal of the first transmission pulse shifted by the pulse repetition time.

The mixed products q'' and i'' of the first echo signal E1 shifted around the pulse repetition Tr are shown in FIG. 11 or FIG. 12.

For the limit case of an infinitely long observation time (averaging, transverse power component set to zero), FIGS. 13 through 16 show the various correlation functions of the unfiltered quadrature components i'' and q'' of two successively following echo signals in an environment of the pulse repetition time Tr.

Figure 13:
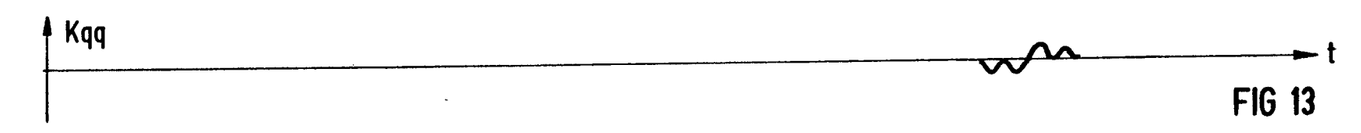
FIG. 13 is the autocorrelation function of the unfiltered quadrature component.
Figure 14:
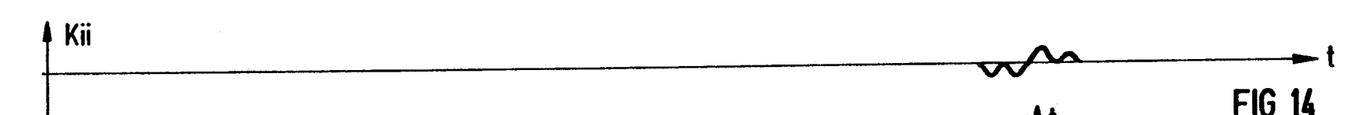
FIG. 14 is the autocorrelation function of the unifltered inphase component.

FIG. 13 shows the autocorrelation function Kqq of the quadrature component q'', and FIG. 14 shows the autocorrelation function Kii of the in-phase component i'' of the echo signals E1 and E2 of two successive transmission pulses S1 and S2.

The wave-shaped autocorrelation function Kqq and Kii arise because the harmonics of the transmission oscillation were not suppressed. Zero would derive here, taking the low-pass filters 4 and 16 in FIG. 1 into consideration. This corresponds to a value of the arc tangent of +90° or −90° and to the argument of the arc tangent being infinite or, respectively, minus infinite.

Figure 15:
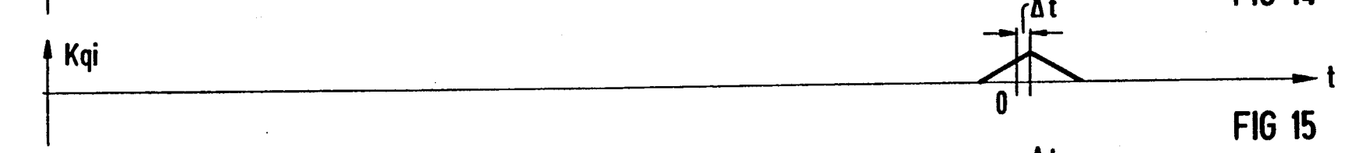
FIG. 15 is the cross coreelation function of the unfiltered quadrature component shifted by the pulse repetition time with the un-shfited, unfiltered in-phase components.
Figure 16:
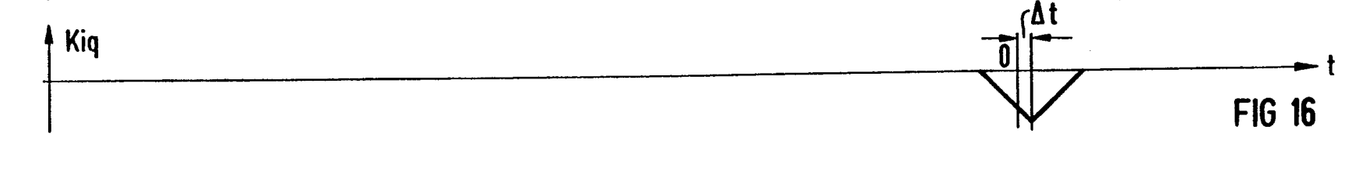
FIG. 16 is the cross correlation function of the unfiltered in-phase component shifted by the pulse repetition time with the unshifted, unfiltered quadrature component.

FIG. 15 shows the cross correlation function Kqi and FIG. 16 shows the cross correlation function Kiq of the quadrature component q'' and of the in-phase component i'' of the echo signals E1 and E2.

Dependent on the velocity in changing correlations Kqq, Kii, Kqi, or Kiq, a trigonometric function as an envelope of the result of the direct correlations is found. Given the velocity of the point reflectors on which FIGS. 13 through 16 are based, the trigonometric function of the envelope is found in the correlation functions Kqi and Kiq. The same envelope yields the autocorrelation of the transmission signal. The shift of the maximum—here in the cross correlation Kqi or Kiq according to FIGS. 15 or 16—is a measure for the distance traversed by the moving particles between two transmission pulses S1 and S2, and is thus a measure for the mean velocity of the particles under consideration.

Here, however, only that region in which the flow velocity (identified in a different way) lies is to be calculated by the time shift $\Delta t$ from the correlations of the demodulated signals. The relationship $$V = \frac{c}{2} \cdot \frac{\Delta t}{Tr}$$

exists between the time shift $\Delta t$ and the mean velocity of the moving particles. c is the speed of sound. The range in which the velocity value calculated in a traditional technique must lie is thus unambiguously defined.

The ambiguities are thus eliminated without making stricter demands of the measuring precision. Given a transmission frequency of 3.5 MHz, which corresponds to a transmission frequency period of T=286 ns, the first ambiguity occurs, for example, at a time shift $\Delta t$ of approximately 70 ns. Thus, when the correlation function is formed with a sampling rate of 30 MHz corresponding to a sampling period of 33 ns, then this is adequate for identifying the velocity range and can be technologically implemented. When the unambiguity up through $k = -\frac{1}{2}$ is utilized, then scanning can be undertaken at 15 MHz.

The measurement of the time shift from the demodulated signals fits well into existing Doppler technology. Digitization in traditional Doppler technology is usually carried out with 6 MHz, so that the sampling frequency would merely have to be doubled for calculating the time shift $\Delta t$. The interface for the digitization can be preserved. Another possibility is that interpolation values from the scanning already existing are formed and processed. The interpolation method also has the following advantage: the low-frequency signal has a high dynamics before the permanent echo suppression with the digital comb filters 22 and 24 in FIG. 1. In the digitization, this requires a great "bit depth" of the analog-to-digital converters 18, 20 in FIG. 1. This can be more easily realized with a "slow" analog-to-digital converter with, for example, a frequency of 6 Mhz than with a "fast" one having, for example, a frequency of 15 MHz.

As an error consideration of the above-described methods proves, the range of measurement in a Doppler imaging system can only be formed for a plurality of resolution cells in common because the necessary measuring time can only be achieved in this way. Given single-beam, multi-port Dopplers as are employed in internal medicine, this restriction does not apply. As set forth above, the time shift $\Delta t$ is extremely small in practice compared to the width of the correlation functions, and for example, amounts to 6 times the transmission period. It is therefore extremely difficult to distinguish between two flow paths having different velocities. This means a low velocity resolution. This is also valid for the case of oppositely directed flow velocities that, for example, are all the more likely to occur in a turbulent flow the greater th signal collecting region. Dependent on its strength, a "side-maximum" of the correlation function at the side mirrored at t=0 can lead to an instability in the maximum localization. The method is thus preferably employable in a small signal collecting region, so that the probability of acquiring greatly different velocities is low.

Given correspondingly low measuring time, i.e. for single-beam Dopplers and given high precision of the time measurement, it nonetheless appears meaningful to acquire a spread of the correlation function. A spread of the envelopes of the correlation functions according to FIGS. 13 through 16 may be anticipated when many different velocities are simultaneously covered. The spread can be interpreted as a measure for the flow turbulence and can replace or supplement the measurement of the scatter of the Doppler spectrum for the regions k greater than ½, i.e. in the region of the ambiguities. Either the correlation function itself is portrayed or a dimension figure for the spread is formed. The measurement of the spread $\sigma$ can occur according to the following equations $$\sigma = \frac{\int_{-TB}^{TB} t^2 \, Kii \, (Tr + t) \, dt}{\int_{-TB}^{TB} Kii \, (Tr + t) \, dt} - (\Delta t)^2$$

and $$\Delta \sigma = \sigma - \sigma_o,$$

whereby $\sigma_o$ is the "scatter" of the envelopes of the autocorrelation function of the transmission pulse. The equations formally correspond to those for the evaluation of the Doppler spectrum. This measuring rule can be applied here either for the function selected by the switch-over means 60 or for the sum of the two functions supplied by the addition circuit 62.

Although various minor changes and modifications might be proposed by those skilled in the art, it will be understood that I wish to include within the claims of the patent warranted hereon all such changes and modifications as reasonably come within my contribution to the art.

I claim as my invention:

1. A method for avoiding frequency ambiguities in a pulse Doppler measuring apparatus, comprising the steps of:
   periodically transmitting transmission pulses with a pulse repetition time into a region having moving particles;
   resolving received echo signals from this region into first and second quadrature signals;
   forming an autocorrelation function from one of the quadrature signals of the echo signals and a cross correlation function from both of the quadrature signals at a location of a shift around the pulse repetition time, and forming these correlation functions during a time range of the pulse repetition time wherein the time range is limited by at least twice a pulse travel time time that a pulse requires in order to cover a distance which is traversed by a particle having a maximum velocity to be measured;
   calculating a shift of a maximum of at least one of the correlation functions with reference to the pulse repetition time;
   calculating an ambiguous mean Doppler radian frequency from values of the correlation functions at the location of the shift around the pulse repetition time, the calculation being a measure for a mean velocity of the moving particles, and defining a frequency range for the mean Doppler radian frequency from the calculated shift of the maximum; and
   selecting from the ambiguous mean Doppler radian frequency a value which lies in said frequency range which is defined by the shift of the maximum, and supplying this value for further signal processing.

2. A method according to claim 1 including the step of identifying the shift of the maximum of the correlation function whose function value is greatest at the location of the shift around the pulse repetition time.

3. A method according to claim 1 including the step of calculating the shift of the maximum from a sum of absolute values of both correlation functions.

4. A method according to claim 1 including the step of resolving the echo signals in a sufficiently broadbanded manner into their first and second quadrature signals such that a spectrum of the echo signals of the individual transmission pulses is substantially preserved.

5. A method according to claim 1 wherein the transmission pulses represent portions of a plurality of periods of a sinusoidal oscillation.

6. A method according to claim 5 wherein a broadband demodulation is provided following a mixing of the echo signal with a sinusoidal and cosine-shaped signal whose frequency is identical to a frequency of the transmission signal to create mixed product quadrature components, these components then being low-pass filtered such that they only contain a spectrum of envelopes of the pulse and so that the transmission frequency and higher harmonics thereof are suppressed.

7. A method according to claim 6 wherein the low-pass-filtered quadrature components are digitized.

8. A method according to claim 7 wherein the digitized quadrature components are freed of permanent echoes so as to create the quadrature signals.

9. A method according to claim 8 wherein the quadrature signals freed of the permanent echoes are divided into a plurality of individual ones of said first and second quadrature signals that lie in chronological succession, said plurality of first and second quadrature signals corresponding to a plurality of signal collecting regions; and the individual first and second quadrature signals being further processed in parallel channels.

10. A method according to claim 1 wherein the transmission pulses are ultrasound pulses.

11. A method for avoiding frequency ambiguities in a pulse Doppler measuring apparatus, comprising the steps of:
   periodically transmitting transmission pulses with a pulse repetition time into a region having moving particles;
   resolving received echo signals from this region into quadrature signals;
   forming an autocorrelation function and a cross correlation function from the quadrature signals at a location of a shift around the pulse repetition time;
   calculating a shift of a maximum of at least one of the correlation functions with reference to the pulse repetition time;
   calculating a mean Doppler radian frequency from values of the correlation functions at a location of a shift around the pulse repetition time, the calculation being a measure for a mean velocity of the moving particles, and defining a frequency range for the mean Doppler radian frequency from the calculated shift of the maximum; and
   selecting from the mean Doppler radian frequency a value which lies in said frequency range which is defined by the shift of the maximum, and supplying this value for further signal processing.

12. A pulse Doppler measuring apparatus, comprising:
  transmitter means for periodically transmitting transmission pulses with a pulse repetition time into a region having moving particles;
  receiver means having demodulator means for resolving received echo signals from said region into their first and second quadrature components;
  two low-pass filter means respectively connected to the demodulator means for the first and second quadrature components such that these quadrature components only contain a spectrum of a pulse envelope of the pulses so that a transmission frequency and higher harmonics thereof are suppressed;
  two analog-to-digital converter means respectively connected to the two low-pass filter means for digitizing the low-pass-filtered quadrature components;
  two filter means respectively connected to the analog-to-digital converter means for removing permanent echoes from the digitized quadrature components so as to create pairs of first and second quadrature signals;
  two region gate means respectively connected to the filter means for distributing the first and second quadrature signal pairs onto respective parallel Doppler evaluation circuit means, the first and second quadrature signal pairs each corresponding to signal collecting regions in the region having moving particles; and
  every Doppler evaluation circuit means having
    two correlator means for calculating an auto-correlation function and a cross correlation function during a time range of a shift around said pulse repetition time, and wherein the time range is limited by at least twice a pulse travel time time that a pulse requires in order to cover a distance that is traversed by a particle having a maximum velocity to be measured,
    the correlator means each being connected to an averaging means for averaging the correlation functions of a plurality of transmission pulses,
    the averaging means each being connected to a selection circuit means for selecting a value at a location of the shift around the pulse repetition time from the averaged correlation functions,
    a shift identification circuit means being connected to the two averaging means for calculating a shift of the maximum of at least one of the correlation functions relative to the pulse repetition time, and
    means for identifying a mean Doppler radian frequency from a respective pair of first and second quadrature signals from the selection circuit means, and regionidentifying circuit means being connected to the shift identification circuit means for defining a region from the shift of the maximum within which lies a value of a plurality of possible values of a mean Doppler radian frequency determined from the respective pair of quadrature signals, the identified value being supplied for further signal processing.

13. A pulse doppler apparatus according to claim 12 wherein the shift identification circuit means comprises a switch-over means for calculating the shift of the maximum from the correlation function whose value is greatest at the location of the shift around the pulse repetition time.

14. A pulse doppler apparatus according to claim 12 wherein the shift identification circuit means comprises an addition circuit means for forming a sum of the correlation functions such that the shift of the maximum is defined by the sum.

15. A pulse doppler apparatus according to claim 12 wherein the averaging means are composed of adders that add up the correlation functions to be averaged, and which output sums for further processing.

16. A pulse Doppler measuring apparatus, comprising:
  transmitter means for periodically transmitting transmission pulses with a pulse repetition time into a region having moving particles;
  receiver means having demodulator means for resolving received echo signals from said region into their first and second quadrature components;
  two low-pass filter means respectively connected to the demodulator means for the first and second quadrature components such that these quadrature components contain a spectrum of a pulse envelope of the pusles wherein a transmission frequency and higher harmonics thereof are suppressed;
  two analog-to-digital converter means respectively connected to the two low-pass filter means for digitizing the low-pass-filtered quadrature components;
  two filter means respectively connected to the analog-to-digital converter means for removing permanent echoes from the digitized quadrature components so as to create pairs of first and second quadrature signals;
  two region gate means respectively connected to the filter means for distributing the first and second quadrature signal pairs onto respective parallel Doppler evaluation circuit means, the first and second quadrature signal pairs each corresponding to signal collecting regions in the region having moving particles;
  the Doppler evaluation circuit means having
    two correlator means for calculating an autocorrelation function and a cross correlation function in an environment of a shift around said pulse repetition time,
    the correlator means each being connected to an averaging means for averaging the correlation functions of a plurality of transmission pulses,
    the averaging means each being connected to a selection circuit means for selecting a value at a location of the shift around the pulse repetition time from the averaged correlation functions,
    a shift identification circuit means being connected to the two averaging means for calculating a shift of the maximum of at least one of the correlation functions relative to the pulse repetition time, and
    means for identifying a mean Doppler radian frequency from a respective pair of first and second quadrature signals from the selection circuit means, and a region-identifying circuit means being connected to the shift identification circuit means for defining a region from the shift of the maximum within which lies a value of a plurality of possible values of a mean Doppler radian frequency determined from the respective pair of quadrature signals, the identified value being supplied for further signal processing.

* * * * *